United States Patent
Karnik

(10) Patent No.: US 8,458,402 B1
(45) Date of Patent: Jun. 4, 2013

(54) DECISION-MAKING SYSTEM AND METHOD FOR IMPROVING OPERATING SYSTEM LEVEL 2 CACHE PERFORMANCE

(75) Inventor: Ashish Karnik, Pune (IN)

(73) Assignee: Symantec Corporation, Mountain View, CA (US)

( * ) Notice: Subject to any disclaimer, the term of this patent is extended or adjusted under 35 U.S.C. 154(b) by 170 days.

(21) Appl. No.: 12/856,956

(22) Filed: Aug. 16, 2010

(51) Int. Cl.
*G06F 13/10* (2006.01)

(52) U.S. Cl.
USPC ........... 711/122; 711/118; 711/133; 711/134; 711/136

(58) Field of Classification Search
USPC .......................... 711/122, 118, 133, 134, 136
See application file for complete search history.

(56) References Cited

U.S. PATENT DOCUMENTS

| | | | |
|---|---|---|---|
| 7,694,075 B1 * | 4/2010 | Feekes, Jr. ..................... | 711/119 |
| 2002/0035666 A1 * | 3/2002 | Beardsley et al. ............ | 711/114 |
| 2003/0110357 A1 * | 6/2003 | Nguyen et al. ................ | 711/136 |
| 2007/0061498 A1 * | 3/2007 | Chua et al. ..................... | 711/103 |
| 2009/0216936 A1 * | 8/2009 | Chu et al. ....................... | 711/103 |
| 2011/0145502 A1 * | 6/2011 | Joshi et al. .................... | 711/125 |

\* cited by examiner

*Primary Examiner* — Jae Yu
(74) *Attorney, Agent, or Firm* — Campbell Stephenson LLP

(57) ABSTRACT

Various systems and methods can decide whether information being evicted from a level one (L1) operating system cache should be moved to a level two (L2) operating system cache. The L2 operating system cache can be implemented using a memory technology in which read performance differs from write performance. One method involves detecting that a portion of a file (e.g., a page) is being evicted from a L1 operating system cache. In response to detecting the imminent eviction of the portion of the file, the method determines whether the portion of the file has been read more frequently or written more frequently. Based upon this determination (e.g., in response to determining that the portion of the file has been read more frequently, if the L2 cache provides better read than write performance), the method decides to copy the portion of the file to the L2 operating system cache.

20 Claims, 5 Drawing Sheets

DECISION-MAKING SYSTEM AND METHOD FOR IMPROVING OPERATING SYSTEM LEVEL 2 CACHE PERFORMANCE

FIELD OF THE INVENTION

This invention relates to caching and, more particularly, to caching files accessed by an application.

DESCRIPTION OF THE RELATED ART

Applications typically operate on user data that is stored in files. In order to process a file, the application needs the operating system to retrieve the file's data from disk and load at least a portion of that data into memory. An operating system caches files as they are accessed by an application in order to improve application performance when the application repeatedly accesses the same files.

As the memory technology used to implement the operating system's cache evolves, new problems may arise. For example, some memory technologies may provide relatively good read performance in conjunction with relatively poor write performance, or vice versa.

SUMMARY OF THE INVENTION

Various systems and methods for deciding whether information being evicted from a level one (L1) operating system cache should be moved to a level two (L2) operating system cache are disclosed. The L2 operating system cache can be implemented using a memory technology in which read performance differs from write performance.

For example, one method involves detecting that a portion of a file (e.g., a page) is being evicted from the L1 operating system cache. In response to detecting the imminent eviction of the portion of the file, the method determines whether the portion of the file has been read more frequently or written more frequently. Based upon this determination (e.g., in response to determining that the portion of the file has been read more frequently, if the L2 cache provides better read than write performance), the method decides to copy the portion of the file to the L2 operating system cache.

In one embodiment, the operation of determining whether the portion of the file has been either read or written more frequently can involve comparing a value (e.g., a relative read to write access frequency) associated with the portion of the file to a threshold value. Alternatively, the operation of determining whether the portion of the file has been either read or written more frequently can involve accessing a ranking associated with the portion of the file. In some embodiments, the ranking can further be associated with a respective frequency value or a respective combination of frequency values. The ranking identifies a rank of the portion of the file relative to several other portions of files stored in the L1 operating system cache. The ranking can, in some embodiments, identify the rank from the point view of relative frequency of access (either biased to read or to write) of the associated portion of the file.

The method can also involve increasing (or decreasing) a value associated with the portion of the file in response to the portion of the file being read (or written), or otherwise modifying the value in response to the portion of the file being accessed. The operation of increasing (or decreasing) the value can be performed while the portion of the file is still stored in the L1 operating system cache. If multiple values (e.g., one for read accesses and one for write accesses) are associated with the portion of the file, the method can also involve increasing a second value (e.g., indicating the frequency of a different type of access than the value) associated with the portion of the file in response to the portion of the file being written. The operation of increasing the second value is also performed while the portion of the file is still stored in the L1 operating system cache. In some embodiments, the method also involves tracking a time history of access to the portion of the file, while the portion of the file is still stored in the L1 operating system cache.

An example of a system can include one or more processors and memory coupled to the one or more processors, as well as the L2 and L2 cache. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
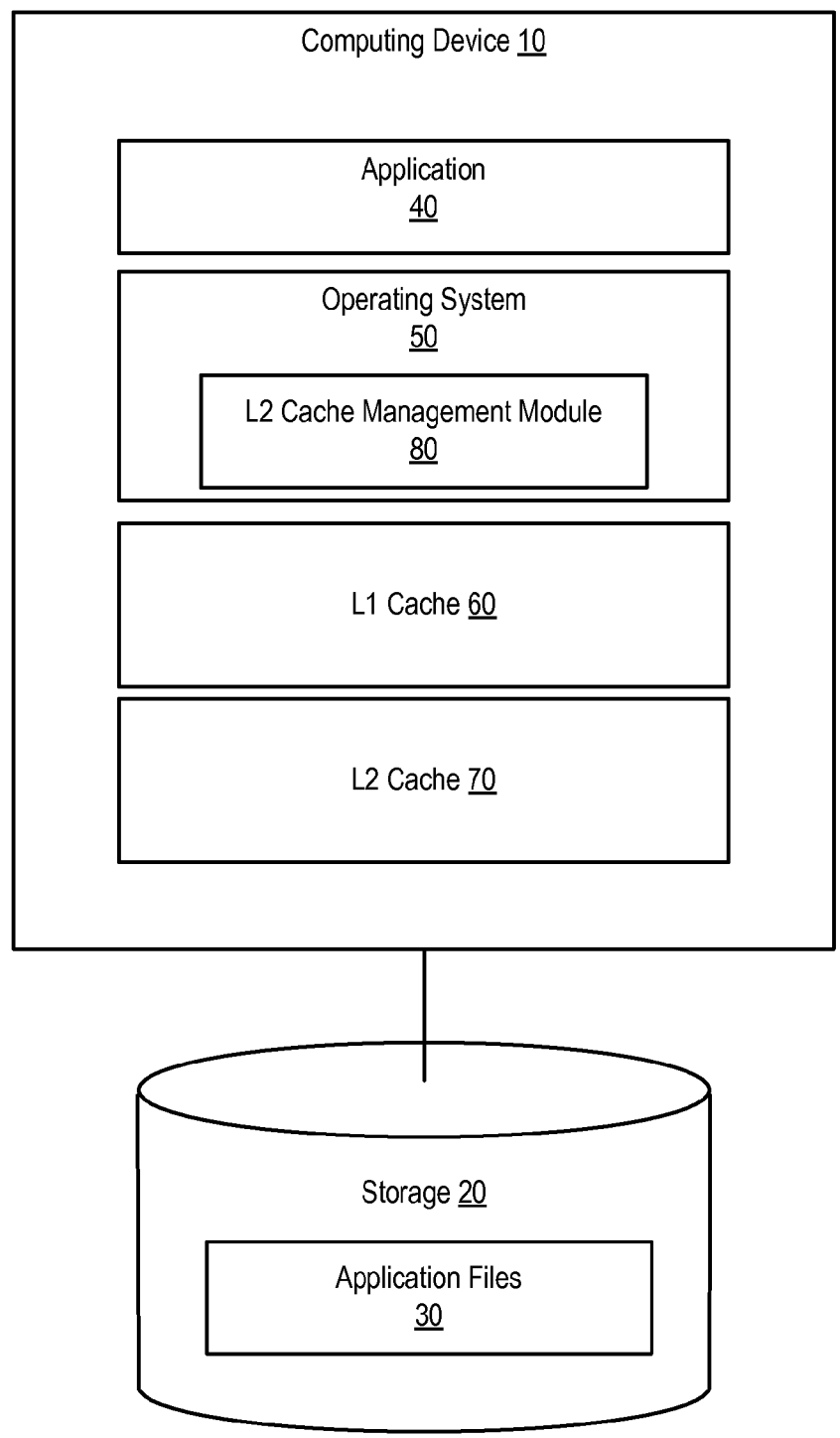
FIG. 1 is a block diagram of a system that selectively moves data to a level two cache, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a computing system. As shown, computing device 10 is coupled to storage device 20. Storage device 20 stores application files 30 that are processed by an application 40. Operating system 50 accesses application files 30 for processing by application 40. Operating system 50 uses two operating system caches: L1 cache 60 and L2 cache 70. These operating system caches provide temporary storage for recently access portions (e.g., pages) of application files 30. Operating system 50 includes an L2 cache management module 80 that controls which portions of application files 30 are loaded into L2 cache 70.

Computing device 10 can be any of a variety of different types of computing devices, including a server, personal computing device, laptop computer, net book, personal digital assistant, cellular phone, or the like. Storage device 20 can include one or more of a variety of different storage devices, including hard drives, compact discs, digital versatile discs, solid state drive (SSD) memory such as Flash memory, and the like. Computing device 10 and storage device 20 can be integrated or separate. If separate, computing device 10 and storage device 20 can be coupled by a network such as the Internet or a storage area network.

Application 40 can be any of a variety of different types of software programs, including programs that act as servers (e.g., database management systems, file servers, backup servers, and the like) and programs that act as clients (e.g., email clients, web browsers, backup clients, and the like). Application 40 can alternatively be a stand-alone user-level program (e.g., a document processing application, a graphics editing program, a media player, or the like). Application 40 accesses (e.g., reads and writes) application files 30 via operating system 50. Application 40 can access application files 30 in order to display, edit, execute, or otherwise process those files.

Operating system 50 provides basic functionality to control basic computing device processes and hardware and to provide a user interface that allows a user to interact with applications such as application 40. Operating system 50 can include various components (not shown), including a file system to control access to application files 30.

L1 and L2 cache 60 and 70 are storage areas that are controlled by operating system 50 (or by a component of operating system 50, such as a file system). L1 and L2 caches provide better access performance than storage device 20. Accordingly, operating system 50 can store a portion of a file in one or both of these caches in order to improve access performance the next time that portion of the file is accessed. In one embodiment, L1 cache 60 is implemented from dynamic random access memory (DRAM) and L2 cache 70 is implemented from solid state drive (SSD) memory, such as flash memory. L1 cache 60 can be included in computing device 10's primary memory in some embodiments. In some embodiments, L1 cache 60 needs to be refreshed regularly and cannot maintain data storage throughout a power outage, while L2 cache 70 can persistently store data even when no longer powered.

As noted above, L1 and L2 caches are implemented using storage technology that provides better performance than that of storage device 20. However, L1 and L2 caches each typically provide far less storage than that provided by storage device 20. Accordingly, in most applications, it is unlikely to be possible to cache all of the application files 30 stored on storage device 20 in the L1 and/or L2 caches. In order to handle these situations, operating system 50 is configured to only store selected portions of the application files 30 in the caches at any given time. Typically, operating system 50 decides what portions of the application files should be cached based upon principles like spatial and temporal locality, which predict that portions of files that are relatively close to (e.g., within the same file or directory) recently accessed portions of files are likely to be accessed (spatial locality) and that portions of files that have recently been accessed are likely to be accessed again (temporal locality). The portions of the files cached by operating system 50 can, in one embodiment, be same-sized blocks or groups of data referred to as pages.

In general, operating system 50 first caches portions of files in L1 cache 60. When L1 cache 60 becomes full and there is a new portion of a file to be cached, operating system 50 will select one of the cached portions in L1 cache 60 for replacement. This selected portion is replaced, which can also be described as being evicted from the L1 cache. If the selected portion has been modified, the modified version can be written back to storage device 20, if it has not already been written. Then, the selected portion is overwritten with a new portion. Various techniques can be used to select the portion to overwrite, including the least recently used (LRU) algorithm, which selects the portion within the L1 cache that has least recently been accessed by an application.

When a portion of a file is evicted from L1 cache 60, that portion can selectively be cached in L2 cache 70 instead of and/or in addition to being written back to storage device 20 (if needed). L2 cache management module 80 detects when a portion of a file is evicted from L1 cache 60 and determines whether that portion should be stored in L2 cache 70. When making this determination, L2 cache management module 80 biases the decision towards a specific type of access (e.g., read or write), such that a portion of a file that has more frequently and/or more recently been accessed according to that specific type of access is more likely to be stored in L2 cache 70.

If a portion of a file is evicted from L1 cache 60 and L2 cache management module 80 decides that the portion of the file should be stored in L2 cache 70, that portion can simply be copied from L1 cache 60 to L2 cache 70. In some embodiments, this copying can occur without the portion also being written back to storage device 20, if the portion was modified while in L1 cache 60. If instead L2 cache management module 80 decides that the portion of the file should not be loaded into L2 cache 70, the portion of the file can be discarded (e.g., deleted or overwritten) and/or written back to storage device 20, as appropriate.

L2 cache 70 may be implemented using a memory technology that has different read and write characteristics (e.g., such a technology can perform better for one type of access than the other). As noted above, in one embodiment, L2 cache 70 is implemented using SSD memory. At least some types of SSD memory can have better read performance than write performance, making such SSD memory perform better as a cache in situations in which cached portions of files are later read than in situations in which cached portions of files are later written. In order to improve the space utilization and/or performance of such an L2 cache, L2 cache management module 80 can selectively bias the storage of portions of files evicted from the L1 cache into the L2 cache such that portions of files that have more recently been read are more likely to be stored in the L2 cache than portions of files that have recently been written or that have not recently been read.

In order to enable L2 cache management module 80 to determine whether a given portion of a file should be copied to L2 cache 70 upon eviction from L1 cache 60, operating system 50 can track the types of access to each portion of a file cached in L1 cache 60. In some embodiments, operating system 50 simply tracks whether a file has been more frequently read or written, without regard to which type of access happened more recently or how recently each type of access occurred. In other embodiments, operating system 50 can track the frequency of each type of access, as well as how recently each type of access occurred. Examples of techniques for tracking these characteristics are described in more detail below.

In one embodiment, operating system 50 simply tracks whether a portion of a file cached in L1 cache 60 has been more frequently read or written while cached in L1 cache 60. In such an embodiment, operating system 50 (or an operating system component such as a file system) can maintain a single value (e.g., an integer) for each portion of a file cached in L1 cache 60. When a portion of a file is initially loaded into L1 cache 60 from storage device 20 or L2 cache 70, operating system 50 can set the corresponding value for that portion of a file to an initial value (e.g., zero or one). If the portion of the file is later accessed, operating system 50 can modify the value in a manner that depends on the type of access. For example, operating system 50 can increase the value (e.g., by adding another value to or multiplying the value by another value) if the portion of the file is read, and decrease the value (e.g., by subtracting another value from or dividing the value by another value) if the file is written.

These operations could be reversed in other embodiments, such that reads result in a decrease in value and writes result in an increase in value. In one embodiment, such a reversal could be accompanied by a reversal in how the value is interpreted (e.g., instead of determining whether the value is greater than a threshold, as described in more detail below, the cache management module can determine whether the value is less than a threshold). In other embodiments, this reversal in how values are calculated can be used to determine whether to store a value into an L2 cache that has better write performance than read performance.

Thus, as an example, when a portion of a file is loaded into L1 cache 60, its corresponding value can be set to one (1). When the portion of the file is read, its corresponding value can be increased by adding one (1) to the initial value, resulting in a new value of two (2). If the portion of the file is read again, the value can again be increased by adding one (1), resulting in a new value of (3). If the portion of the file is then written, the value can be decreased by subtracting one (1), resulting in a final value of two (2). At this point, the portion of the file is selected for eviction from L1 cache 60, so L2 cache management module 80 uses the current value (two (2)) of the portion's associated value to determine whether to load that portion into L2 cache 70.

When a single value is used in this manner to track whether a portion of a file has been more recently read or written, L2 cache management module 80 can compare the single value to a threshold value when determining whether to load the corresponding portion of a file into the L2 cache upon its eviction from the L1 cache. For example, if L2 cache management module 80 is biasing towards more frequently read portions (e.g., because L2 cache 70 has better read than write performance characteristics), and if operating system 50 is increasing the value in response to read accesses, L2 cache management module 80 can select to only load the portion of the file into L2 cache 70 if its corresponding value exceeds the threshold value. (If instead the values are reduced in response to accesses, the cache management module can select to load the portion into the L2 cache if the value is less than the threshold.)

Alternatively, the values can be used to rank the portions of the files currently loaded in the L1 cache. For example, the values can be used to order the portions of the files according to ascending or descending values, such that the each portion is ordered relative to the other portions. In such a situation, L2 cache management module 80 can be configured to only load a portion of a file into L2 cache 70 if that portion's rank exceeds a particular rank. For example, if there are 1024 portions of files allowed in L1 cache 60, L2 cache management module 80 can be configured to only load a portion of a file into L2 cache 70 if that portion's rank exceeds 512. In generally, the rank can be selected so that a fixed percentage of the portions of files in the L1 cache are eligible to be moved to the L2 cache at any given time.

As noted above, in some embodiments the operating system can track both the relative frequency of types of access to a portion of a file (each type of access can even be tracked separately, if desired) and how recently that portion of a file was accessed. In one embodiment, operating system 50 maintains two values (e.g., two unsigned integers) for each portion of a file currently stored in L1 cache 60. The first value corresponds to read access of that portion, and the second value corresponds to write access of that portion. To track the relative frequency of each type of access to the portion of the file, operating system 50 increases (e.g., by multiplying or adding to) the value whenever the corresponding type of access occurs. Thus, whenever the portion of the file is read, operating system 50 increases the first value. Similarly, whenever the portion of the file is written, operating system 50 increases the second value. (While specific increase and decrease operations are discussed, it is noted that these operations can be reversed in other embodiments, such that the operating system can decrease a value instead of increasing it whenever a specific type of access occurs.) In one embodiment, the increases are implemented by performing a logical OR operation that takes the appropriate value and $2^{(n-1)}$ as inputs, where n is size of the value in bits.

In order to track how recently each type of access takes place, operating system 50 can gradually decrease each value over time, such that a less recent access of a given type will be represented by a smaller value than a more recent access of that same type (alternatively, these values can be increased over time, such that less recent accesses will be represented by larger values). For example, once per a given unit of time, operating system 50 can decrease (e.g., by dividing or subtracting from) each value. In one embodiment, the values can be decreased by dividing the values by two (2) or shifting each value one bit towards the least significant end of the byte. Operating system 50 can perform this operation each time the L1 cache is scanned to select one or more portions of files for eviction from the L1 cache. Using the occurrence of such a scanning event to control when the values are decreased causes the values to decrease faster when memory pressure is higher (as evidenced by more frequent movement of data out of the L1 cache), which in turn causes the algorithm to give more weight to recently accessed pages. Other time intervals can also be used to control when the operating system modifies the values instead of and/or in addition to the occurrence of scanning events.

In embodiments that use two values to respectively represent the frequency and time history of each type of access, L2 cache management module 80 can calculate the difference between or ratio of the values. This difference or ratio value can then be used as a ranking or compared to a threshold, in the manner described above, in order to determine whether the portion is eligible to be transferred to the L2 cache.

In still other embodiments, operating system 50 can track the frequency and time history of accesses to portions of files in L1 cache 60 by maintaining a single value that represents the relative frequency of the two types of accesses relative to each other (e.g., as described above) for the most current time interval, and then maintaining a second value that represents the time history of that portion's accesses within the L1 cache. Here, each time a time interval expires (e.g., as detected by the L1 cache being scanned for candidates for eviction), the first value can be combined with the second value. For example, the first value can be added to the second value, and then the second value can be divided by n, where n is any integer (e.g., two (2)). After being combined with the second value, the first value can be reset to an initial value (e.g., zero) for the next time interval.

In embodiments that use two values like this, L2 cache management module 80 can use only the second value (which represents the time history of accesses to the portion of the file) or a combination of the first and second value (e.g., a sum) to determine whether to move the portion of the file to the L2 cache. As with the other examples, the value can be compared to a threshold or used as a ranking to make this determination.

Figure 2:
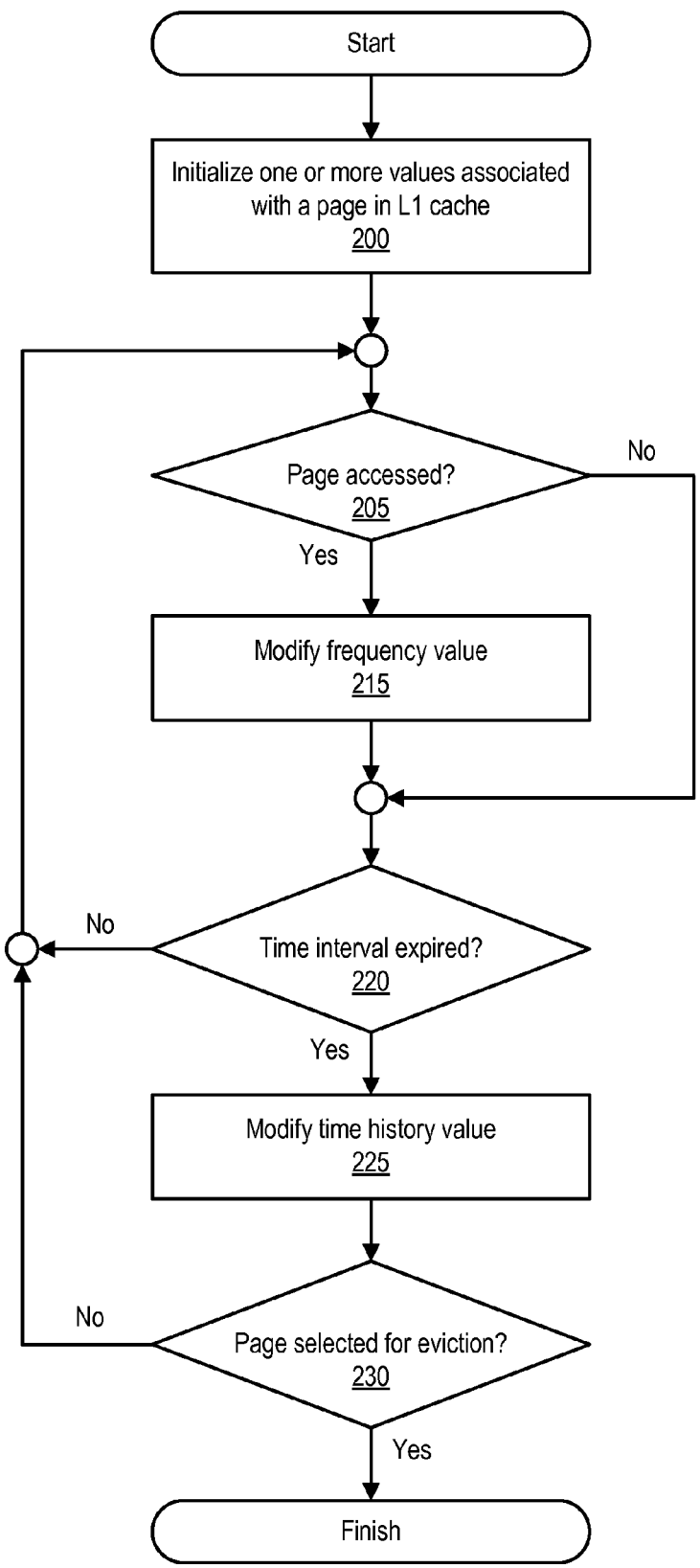
FIG. 2 is a flowchart of a method of maintaining one or more values associated with data in a level one cache, according to embodiments of the present invention.

FIG. 2 shows a method of maintaining values for each portion of a file within an L1 cache. Here, the portions of files are referred to as pages. This method can be performed by an operating system (e.g., operating system 50 of FIG. 1) or operating system component such as a file system.

The method begins at 200, when the operating system loads a page into the L1 cache and initializes one or more values that are associated with that page. For example, if a single value is being used to track the relative frequency of read accesses versus write accesses (or vice versa), that value can be set to an initial value. If multiple values are being used (e.g., to track types of access separately, or to track relative frequency in the current interval as well as a time history of accesses), all values can be initialized.

If the page is subsequently accessed while residing in the L1 cache, as detected at 205, the operating system modifies the appropriate frequency value, as shown at 215. For example, if a single value is being maintained to track frequency (e.g., for all time, or only for the current interval), the operating system can increase or decrease this value, depending on the type of access (e.g., read or write) that occurred. If two values are used to track frequency, the operating system can modify (e.g., by increasing) the value that corresponds to the type of access that occurred.

If the operating system is also tracking the time history of accesses to the page, the operating system can perform operations 220 and 225 (these operations can be omitted in embodiments that only maintain a single frequency value and do not track time history). At 220, the operating system determines whether a time interval has expired. For example, time intervals can be defined as the intervals between times at which the L1 cache is scanned for candidates for eviction. Alternatively, time intervals can be defined as predefined time periods (e.g., as determined using a timer or clock).

If a time interval has expired, the operating system modifies the appropriate time history value, as shown at 225. For example, if a value is being maintained for each type of access, the operating system can reduce that value at the end of each time interval. If instead a single value is being used to maintain the time history of both types of access, that value can be combined with a frequency value generated for the just-ended time interval.

If the page is selected for eviction, as detected at 230, the operating system will cease modifying its associated value(s). The final value(s) associated with the page can be used by an L2 cache management module to determine whether to load the evicted page into the L2 cache.

Figure 3:
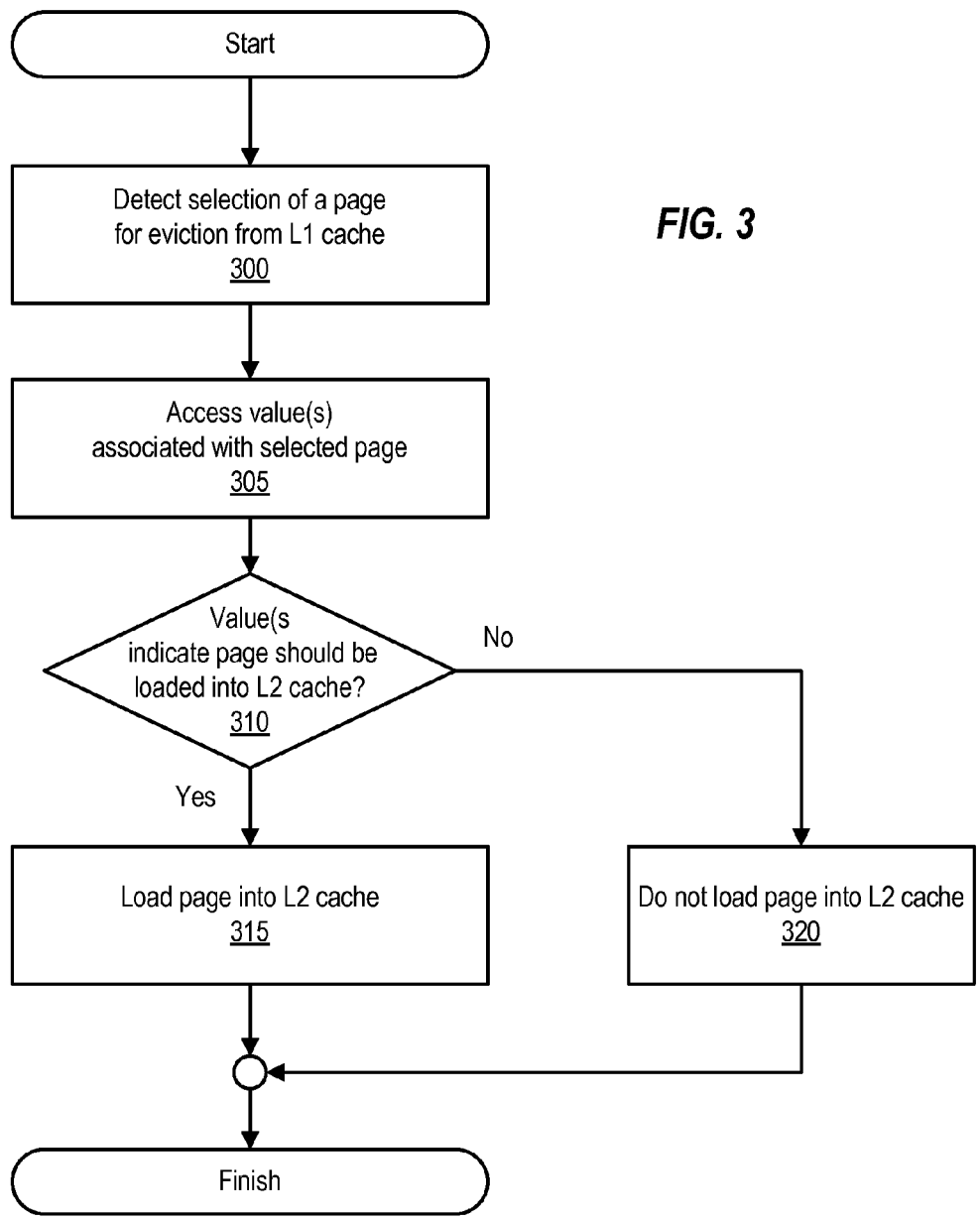
FIG. 3 is a flowchart of a method of selecting whether to move data being evicted from a level one cache to a level two cache, according to embodiments of the present invention.

FIG. 3 illustrates a method of using one or more values that track the relative frequency of different types of access to a page to determine whether to cache that page in an L2 cache upon eviction from an L1 cache. This method can be performed by an L2 cache management module (e.g., L2 cache management module 80 of FIG. 1).

The method begins at 300, when the L2 cache management module detects that a page in the L1 cache has been selected for eviction. In response, the L2 cache management module accesses one or more values associated with the page, as shown at 305. Such values can include, for example: a single value that indicates the relative frequency of one type of access relative to another; a set of two values, where the first value indicates the time history of frequency of one type of access and the second value indicates the time history of frequency of the other type of access; or a set of two values, where the first value indicates the relative frequency of one type of access relative to the other in the most recent time interval and the second value indicates the time history of relative frequencies.

Based on the accessed value(s), the L2 cache management module determines whether the value(s) indicate that the page should be loaded into the L2 cache, as shown at 310. If multiple values are accessed, the L2 cache management module can combine these values (e.g., by calculating the difference between the values or generating a ratio of the values) into a single value or simply select a single one of the values. The L2 cache management module can then use the single value as a ranking or compare the single value to a threshold to determine whether the page should be loaded into the L2 cache, as shown at 315, or prevented from being loaded into the L2 cache, as shown at 320.

Figure 4:
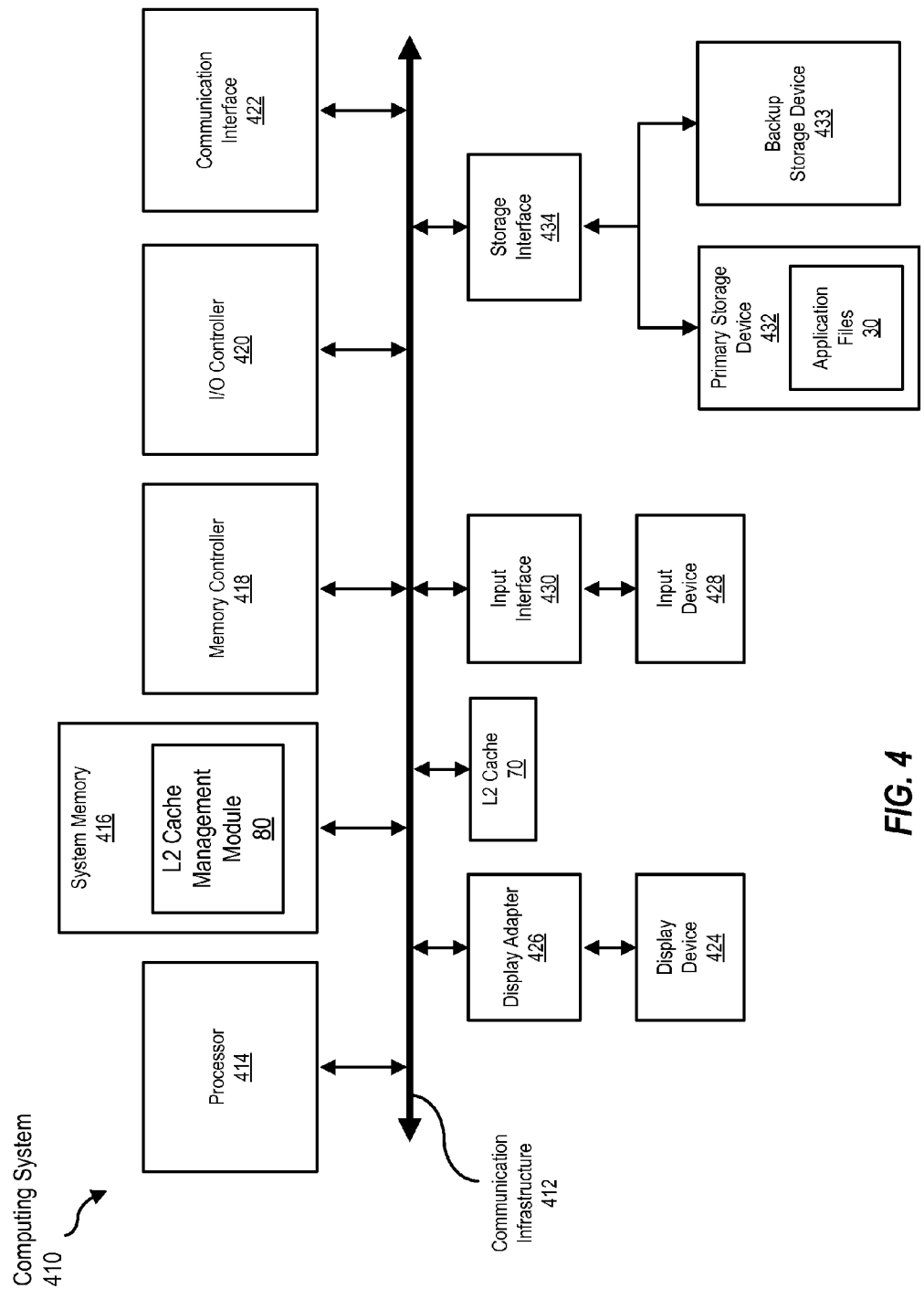
FIG. 4 is a block diagram of a computing device, illustrating how a Level 2 (L2) cache management module can both be implemented in software, according to one embodiment of the present invention.

FIG. 4 is a block diagram of a computing system 410 capable of implementing an L2 cache management module as described above. Computing system 410 broadly represents any single or multi-processor computing device or system capable of executing computer-readable instructions. Examples of computing system 410 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 410 may include at least one processor 414 and a system memory 416. By executing the software that implements an L2 cache management module 80, computing system 410 becomes a special purpose computing device that is configured to provide improved performance of an L2 operating system cache.

Processor 414 generally represents any type or form of processing unit capable of processing data or interpreting and executing instructions. In certain embodiments, processor 414 may receive instructions from a software application or module. These instructions may cause processor 414 to perform the functions of one or more of the embodiments described and/or illustrated herein. For example, processor 414 may perform and/or be a means for performing all or some of the operations described herein. Processor 414 may also perform and/or be a means for performing any other operations, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432 and/or L2 cache 70, as described in detail below). In one example, an L2 cache management module 80 may be loaded into system memory 416. System memory 416 can include an L1 cache (e.g., L1 cache 60 of FIG. 1) used by an operating system or operating system component such as a file system to cache portions of files accessed by an application.

In certain embodiments, computing system 410 may also include one or more components or elements in addition to processor 414 and system memory 416. For example, as illustrated in FIG. 4, computing system 410 may include an L2 cache 70 (e.g., an SSD memory device), a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller 418 may perform and/or be a means for performing, either alone or in combination with other elements, one or more of the operations or features described and/or illustrated herein.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, computing system 410 may also include at least one input device 428 coupled to communication infrastructure 412 via an input interface 430. Input device 428 generally represents any type or form of input device capable of providing input, either computer or human generated, to computing system 410. Examples of input device 428 include, without limitation, a keyboard, a pointing device, a speech recognition device, or any other input device.

As illustrated in FIG. 4, computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may each include a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. A storage device like primary storage device 432 can store information such as application files 30, as described above.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4.

Computing system 410 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 410 for storage in memory via a network such as the Internet or upon a carrier medium.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the embodiments described and/or illustrated herein. Additionally or alternatively, one or more of the embodiments described and/or illustrated herein may be implemented in firmware and/or hardware. For example, computing system 410 may be configured as an application specific integrated circuit (ASIC) adapted to implement one or more of the embodiments disclosed herein.

While FIG. 4 shows L2 cache 70 as a separate device, other embodiments can implement L2 cache 70 differently. For example, L2 cache 70 can be a part of storage interface 434 or primary storage device 432 or connected through communication interface 422. Other variations are also possible.

Figure 5:
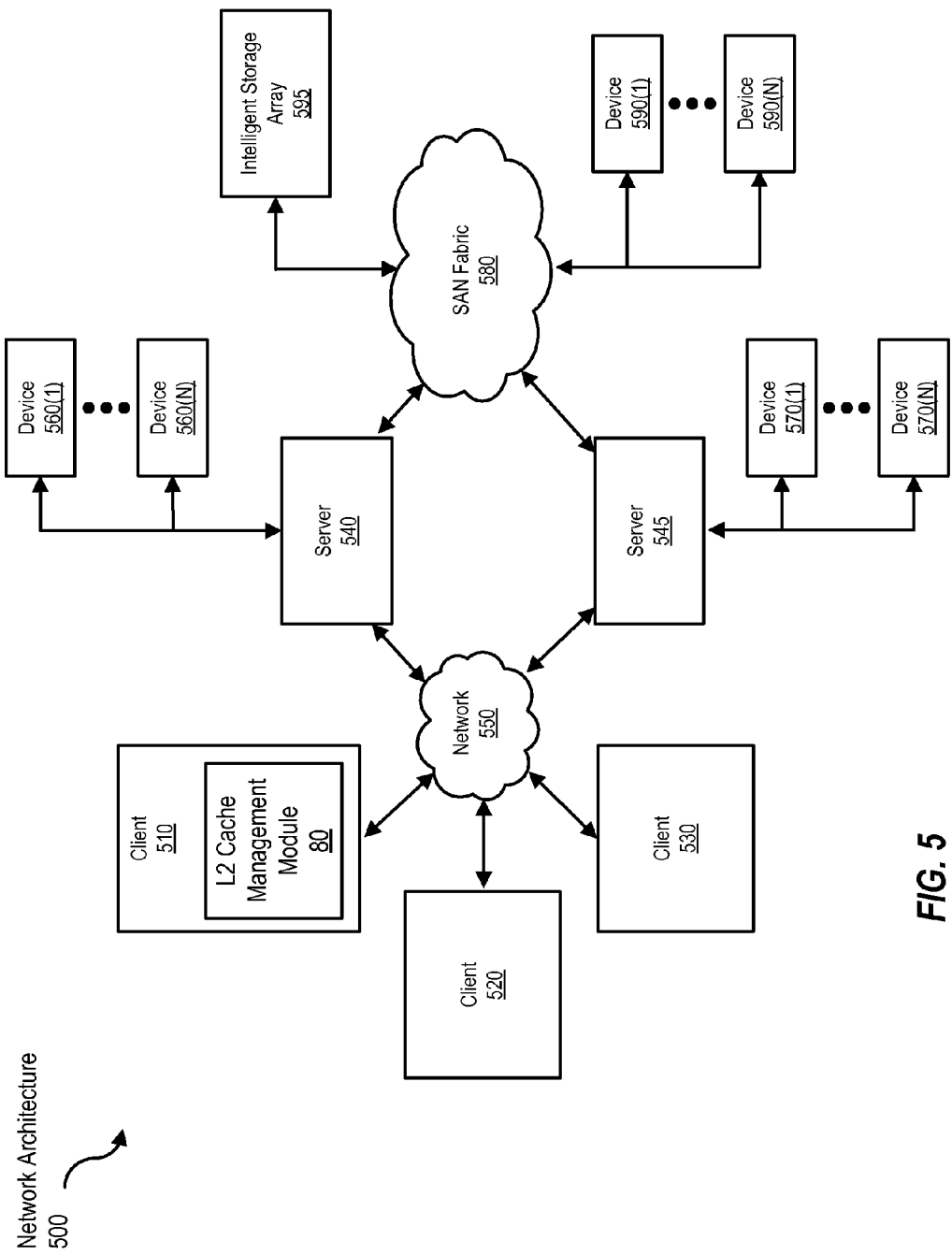
FIG. 5 is a block diagram of a networked system, illustrating how various computing devices can communicate via a network, according to one embodiment of the present invention.

FIG. 5 is a block diagram of a network architecture 500 in which client systems 510, 520, and 530 and servers 540 and 545 may be coupled to a network 550. Client systems 510, 520, and 530 generally represent any type or form of computing device or system, such as computing system 410 in FIG. 4.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet. In one example, client systems 510, 520, and/or 530 and/or servers 540 and/or 545 may include an L2 cache management module 80 as shown in FIGS. 1 and 4. Such systems may also each include a respective L2 cache managed by an L2 cache management module. Alternatively, an L2 cache for one or more of such systems may be included another location, such as SAN fabric 580 or in a storage array that supports SSD Flash drives.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as Network File System (NFS), Server Message Block (SMB), or Common Internet File System (CIFS).

Servers 540 and 545 may also be connected to a storage area network (SAN) fabric 580. SAN fabric 580 generally represents any type or form of computer network or architecture capable of facilitating communication between multiple storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the embodiments disclosed herein may also be encoded as a computer program, stored in server 540, run by server 545, and distributed to client systems 510, 520, and 530 over network 550.

In some examples, all or a portion of the computing devices in FIGS. 4 and 5 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, an L2 cache management module 80 in FIG. 1 may transform the occupancy of an L2 operating system cache by controlling which sets of information being evicted from an L1 cache are allowed to be loaded into the L2 cache.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   tracking how frequently a portion of a file is read while the portion of the file resides in a level one (L1) operating system cache;

tracking how frequently the portion of the file is written while the portion of the file resides in the L1 operating system cache;
detecting that the portion of the file is being evicted from the L1 operating system cache;
in response to the detecting, determining whether the portion of the file was read more frequently than the portion of the file was written to while the portion of the file resided in the L1 operating system cache, based on the tracking how frequently the portion of the file is read and the tracking how frequently the portion of the file is written;
in response to the determining, deciding to copy the portion of the file to a level two (L2) operating system cache.

2. The method of claim 1, wherein the determining comprises comparing a value associated with the portion of the file to a threshold value.

3. The method of claim 1, wherein the determining comprises accessing a ranking associated with the portion of the file, wherein the ranking identifies a rank of the portion of the file relative to a plurality of other portions of files stored in the L1 operating system cache.

4. The method of claim 1, further comprising increasing a value associated with the portion of the file in response to the portion of the file being read, wherein the increasing is performed while the portion of the file is still stored in the L1 operating system cache.

5. The method of claim 4, further comprising increasing a second value associated with the portion of the file in response to the portion of the file being written, wherein the increasing is performed while the portion of the file is still stored in the L1 operating system cache.

6. The method of claim 1, wherein the L2 operating system cache is implemented using a memory technology in which read performance differs from write performance.

7. The method of claim 1, further comprising tracking a time history of access to the portion of the file, while the portion of the file is still stored in the L1 operating system cache.

8. A computer readable storage medium comprising program instructions executable to:
track how frequently a portion of a file is read while the portion of the file resides in a level one (L1) operating system cache;
track how frequently the portion of the file is written while the portion of the file resides in the L1 operating system cache;
detect that the portion of the file is being evicted from the L1 operating system cache;
determine whether the portion of the file was read more frequently than the portion of the file was written to while the portion of the file resided in the L1 operating system cache, in response to a determination that the portion of the file is being evicted from the L1 operating system cache, based on tracking how frequently the portion of the file is read and tracking how frequently the portion of the file is written;
decide to copy the portion of the file to a level two (L2) operating system cache, in response to a determination as to whether the portion of the file has been read more frequently or written more frequently.

9. The computer readable storage medium of claim 8, wherein the program instructions are further executable to compare a value associated with the portion of the file to a threshold value while determining whether the portion of the file has been read more frequently or written more frequently.

10. The computer readable storage medium of claim 8, wherein the program instructions are further executable to access a ranking associated with the portion of the file while determining whether the portion of the file has been read more frequently or written more frequently, wherein the ranking identifies a rank of the portion of the file relative to a plurality of other portions of files stored in the L1 operating system cache.

11. The computer readable storage medium of claim 8, wherein the program instructions are further executable to increase a value associated with the portion of the file in response to the portion of the file being read, wherein the value is increased while the portion of the file is still stored in the L1 operating system cache.

12. The computer readable storage medium of claim 11, wherein the program instructions are further executable to increase a second value associated with the portion of the file in response to the portion of the file being written, wherein the value is increased while the portion of the file is still stored in the L1 operating system cache.

13. The computer readable storage medium of claim 8, wherein the L2 operating system cache is implemented using a memory technology in which read performance differs from write performance.

14. The computer readable storage medium of claim 8, the program instructions are further executable to track a time history of access to the portion of the file, while the portion of the file is still stored in the L1 operating system cache.

15. A system comprising:
one or more processors;
a level 1 (L1) operating system cache;
a level 2 (L2) operating system cache; and
memory coupled to the one or more processors, wherein the memory stores program instructions executable by the one or more processors to:
track how frequently a portion of a file is read while the portion of the file resides in a level one (L1) operating system cache;
track how frequently the portion of the file is written while the portion of the file resides in the L1 operating system cache;
detect that a portion of a file is being evicted from the L1 operating system cache;
determine whether the portion of the file was read more frequently than the portion of the file was written to while the portion of the file resided in the L1 operating system cache, based on tracking how frequently the portion of the file is read and tracking how frequently the portion of the file is written, in response to a determination that the portion of the file is being evicted from the L1 operating system cache;
decide to copy the portion of the file to the L2 operating system cache, in response to a determination as to whether the portion of the file has been read more frequently or written more frequently.

16. The system of claim 15, wherein the program instructions are further executable to compare a value associated with the portion of the file to a threshold value while determining whether the portion of the file has been read more frequently or written more frequently.

17. The system of claim 15, wherein the program instructions are further executable to access a ranking associated with the portion of the file while determining whether the portion of the file has been read more frequently or written more frequently, wherein the ranking identifies a rank of the portion of the file relative to a plurality of other portions of files stored in the L1 operating system cache.

18. The system of claim 15, wherein the program instructions are further executable to increase a value associated with the portion of the file in response to the portion of the file being read, wherein the value is increased while the portion of the file is still stored in the L1 operating system cache.

19. The system of claim 18, wherein the program instructions are further executable to increase a second value associated with the portion of the file in response to the portion of the file being written, wherein the value is increased while the portion of the file is still stored in the L1 operating system cache.

20. The system of claim 8, the program instructions are further executable to track a time history of access to the portion of the file, while the portion of the file is still stored in the L1 operating system cache.

\* \* \* \* \*